United States Patent [19]

Pecard

[11] Patent Number: 5,154,015
[45] Date of Patent: Oct. 13, 1992

[54] ICE FISHING HOLE COVER UNIT

[76] Inventor: Arnald Pecard, 2357 S. Ninth Pl., Milwaukee, Wis. 53215

[21] Appl. No.: 710,700

[22] Filed: Jun. 5, 1991

[51] Int. Cl.$^5$ ............................................. A01K 97/01
[52] U.S. Cl. ......................................................... 43/4
[58] Field of Search .......................... 43/4, 15, 16, 17; 404/10

[56] References Cited

U.S. PATENT DOCUMENTS

| | | | |
|---|---|---|---|
| 3,010,238 | 11/1961 | Cromrine, Jr. et al. | 43/16 |
| 3,024,560 | 3/1962 | Clark | 43/17 |
| 3,230,655 | 1/1966 | Nomsen | 43/17 |
| 3,466,781 | 9/1969 | Nelson et al. | 43/4 |
| 3,499,413 | 3/1970 | Heard | 404/10 |
| 3,698,117 | 10/1972 | Wiltse | 43/17 |
| 3,745,689 | 7/1973 | Williams | 43/17 |
| 3,813,891 | 6/1974 | Wootten | 43/1 |
| 4,218,840 | 8/1980 | Cohee | 43/4 |
| 4,310,983 | 1/1982 | Irvin et al. | 43/17 |
| 4,794,718 | 1/1989 | Tillman | 43/4 |
| 4,934,090 | 6/1990 | Storey et al. | 43/17 |
| 4,953,317 | 9/1990 | Ruchel | 43/17 |
| 4,993,182 | 2/1991 | Monsen | 43/17 |

Primary Examiner—Richard K. Seidel
Assistant Examiner—Jeanne M. Elpel
Attorney, Agent, or Firm—Andrus, Sceales, Starke & Sawall

[57] ABSTRACT

A plastic hole cover unit includes a rectangular cover base of a dished construction with a continuous rim and internal support members which rest on the ice to cover the fishing opening. The base has a narrow diametric slot with sidewalls and extends from an edge of the cover to approximately the center. An integral cone-shaped post has a flat wall spaced slightly from and perpendicular to the inner end of the slot. A curved outer conical wall is integrally formed with the opposite side of the flat wall. The post has a small top opening which enlarges downwardly for significant exposure of the fishing opening for viewing of the water. The cover unit is formed of an opaque material to block light which could reflect off the water surface. A removable cap closes the top opening to trap the heat within the cover unit. The outer surface of the cover unit is provided with a black surface to increase radiant energy absorption and heating of air within the cover unit. Orange or other bright colored coating is on the top post portion to clearly signal the location of the fishing hole.

15 Claims, 5 Drawing Sheets

ICE FISHING HOLE COVER UNIT

BACKGROUND OF THE INVENTION

This invention relates generally to an ice fishing hole cover and support device and particularly to an integrated device which is adapted to cover a fishing hole and prevent freezing over of the hole. The device also provides for support of the fishing reel and associated equipment.

Ice fishing, in a uniform way, involves drilling or otherwise forming a hole in the ice cover of a lake or river with a sufficient diameter to accommodate ice fishing equipment, which may include a reel and fishing line assembly as well as a suitable tip up to provide automatic signaling when a fish bites as well as quick and easy pulling of a hooked fish from the water. A continuing problem presented in ice fishing is maintaining the ice fishing hole in the open condition. Various devices have been suggested for mounting in or in an overlying relationship to the hole to prevent the water from freezing while maintaining access to the fishing equipment. Generally, the device also provides some support for the fishing equipment. Various devices have been suggested including structures which tend to trap a quantity of air overlying the hole with means for heating of such air by solar energy or actual heating devices placed within the unit. For example, a recent U.S. Pat. No. 4,953,317, which issued Sept. 4, 1990, discloses a special domed cover structure which has a projecting tube adapted to project downwardly through the hole and into the water in combination with an upper integrated dome cover which telescopes into the water projecting tube. The dome is particularly formed of a suitable material which will absorb and transmit impinging solar radiant energy into the air confined under the cover structure. The cover device serves to prevent the water from freezing within the opening and protect the fishing device during the fishing operation. Other similar systems are shown for example, in U.S. Pat. No. 4,794,718, which issued Jan. 3, 1989; U.S. Pat. No. 3,698,117, which issued Oct. 17, 1972; U.S. Pat. No. 3,745,689, which issued July 17, 1973; and U.S. Pat. No. 4,310,983, which issued Jan. 19, 1982. Other devices are also known, for example, as shown in U.S. Pat. No. 4,934,090, which issued Feb. 19, 1990 and discloses a laminated plate-like structure which is adapted to be placed into the hole and maintain the hole open. Various signaling devices are mounted onto the unit and coupled to a fishing line for activation in response to a hooked fish condition. U.S. Pat. No. 3,230,655 also discloses a somewhat different system in disclosing a clear plastic cone-shaped member adapted to rest on the ice and overlie the opening. The cone-shaped member has a central top opening with the fishing tip up device and a reel support structure extended downwardly through the center of the cone-shaped member. One of the advantages of this structure is said to be the fact that it can be formed from a simple flat piece of transparent plastic of a generally semi-circular configuration, which is wrapped around with the opposed flat edges connected to form the cone-shaped member.

One of the problems associated with the existing devices is the inability of other fisherman to see the devices in moving over the ice-covered lake. The complexity of certain devices result in a relatively costly construction from a manufacturing standpoint and a corresponding retail cost. Many ice fisherman are cost conscience and consequently cannot or will not purchase costly cover devices. Other devices do not appear to meet the demands of ice fisherman.

There is therefore a continuing need for a simple, reliable and inexpensive unit for protecting an ice fishing hole against freezing over.

SUMMARY OF THE PRESENT INVENTION

The present invention is particularly directed to a simple, but improved, effective and reliable fishing hole cover unit which can be constructed and marketed as a reasonable cost and retail price. Generally, in accordance with the present invention, a plastic cover unit includes a base cover providing an essentially continuous closure which is preferably supported on the ice overlying a fishing hole, or may be floating on the water within the hole. The cover includes a narrow slit or opening for accommodating the interconnection of a fishing line attached to a fishing pole or to a supported reel and tip up unit. Within the continuous cover portion and adjacent to the slit or slot, a vertical upstanding tubular post is integrally formed with the cover. The post in a preferred construction is formed as a semi-conical member having a flat vertical wall adjacent to the center portion of the cover and a conical outer wall connected to the flat wall. The flat wall serves to locate a tip unit in a stable position. The post forms an opening through which the fisherman can view the fishing hole. In addition, the upstanding, vertical post is provided with a suitable visual indicating system such as a fluorescence orange on the upper end such that the cover unit, and thus the fishing location, is readily apparent to anyone approaching that area during the day or night.

More particularly, in a preferred and practical construction of the present invention, the fishing hole cover unit is formed of a suitable molded plastic or the like having a high thermal insulating factor, such as styrofoam. The cover base is preferably a generally rectangular dished member having a flat top surface and a continuous depending rim or edge portion and internal support members. The cover is mounted with the rim and support members resting on the ice and totally overlying the fishing opening. The dished cover member is formed of a relatively thin plastic material so as to minimize the material cost and is molded or otherwise formed with a narrow diametric slit extending inwardly from one edge of the cover to approximately the center of the cover. The slit is formed with integral, depending sidewalls to maintain substantial enclosure over the opening. The integral upstanding cone-shaped member is formed within the rectangular cover with the flat surface spaced slightly from the inner end of the slit and extending perpendicular thereto. The curved outer conical wall is integrally formed with the cover to the opposite side of the flat wall from the slot structure. In placing the cover unit on the ice, the curved wall is placed facing the wind to protect the opening therefrom. The cone shaped member is also formed of a relatively thin material and defines a small top opening which enlarges downwardly into the cover for significant exposure of the fishing opening for viewing of the water. With the cover unit formed of an opaque material, light is blocked from around and in the opening. If the light is not blocked, the light could reflect off the water surface. A removable cap closes the top opening to trap the heat within the cover unit.

The outer surface of the cover unit is provided with a black surface to increase the absorption of the radiant energy which is transmitted through the thin wall to the air within the covered structure. The upper end of the cone-shaped member is provided with the visual indicating unit in the form of a simple bright orange or other bright colored coating which will stand out and provide clear indication to any approaching person of the existence and location of the fishing hole cover.

The present invention provides a simple, but highly effective fishing hole cover unit which will maintain the hole open, effectively signal the location of the fishing hole to other persons and maintain the cost of the fishing hole cover to an essentially minimum cost factor.

DESCRIPTION OF THE DRAWING FIGURES

The drawings furnished herewith illustrate the best mode presently contemplated for carrying out the invention and are described hereinafter.

DESCRIPTION OF THE ILLUSTRATED EMBODIMENT

Figure 1:
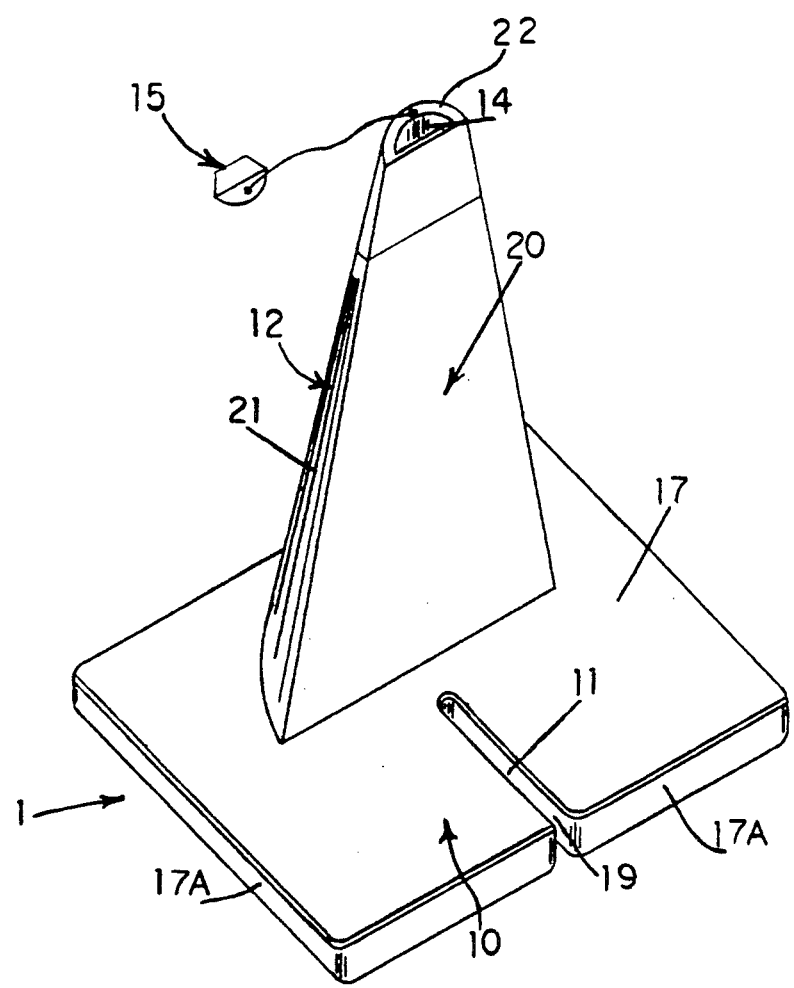
FIG. 1 is a pictorial view of a fishing hole cover unit constructed in accordance with the present invention.
Figure 2:
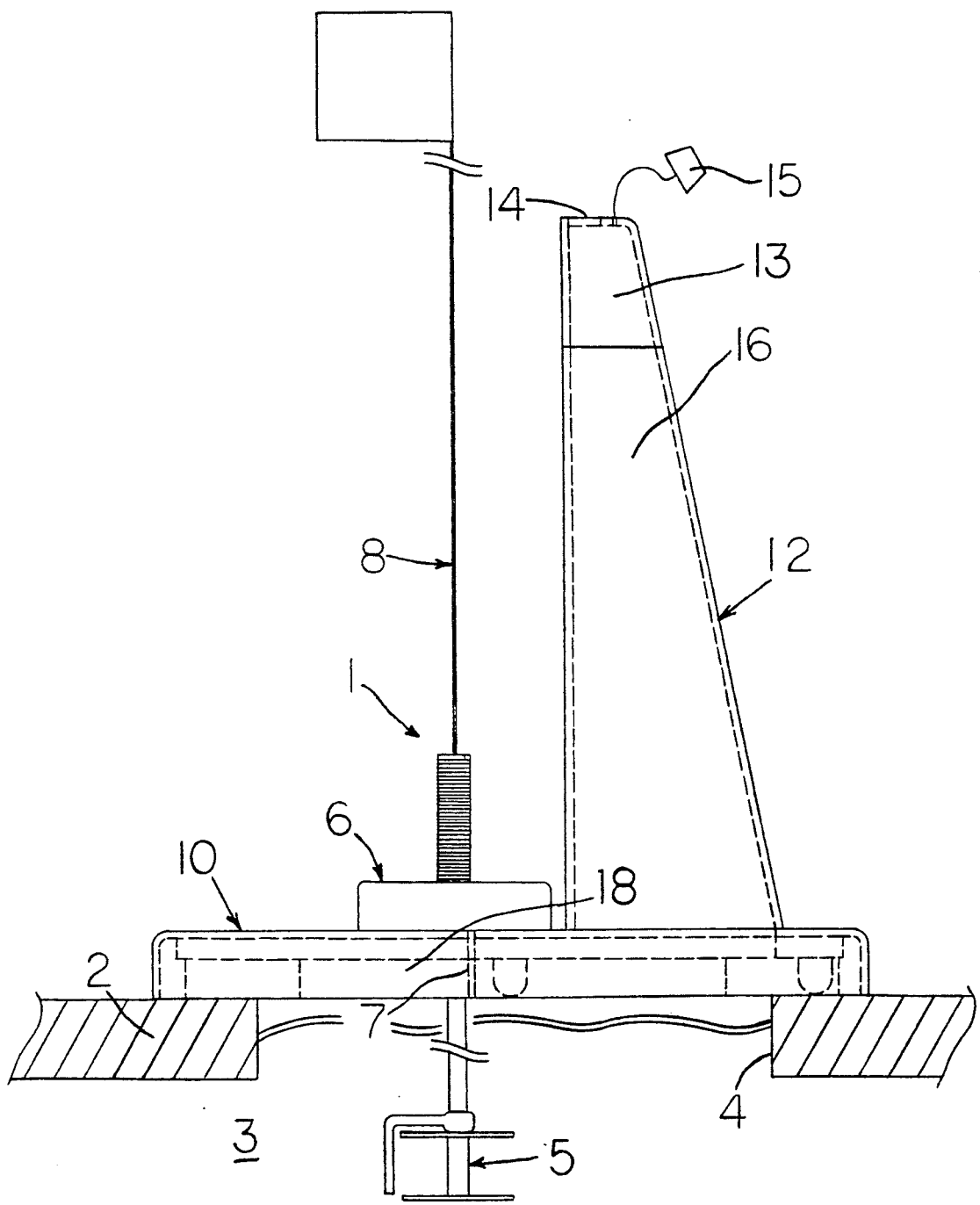
FIG. 2 is an elevational view of the fishing hole cover unit applied to a fishing hole.
Figure 3:
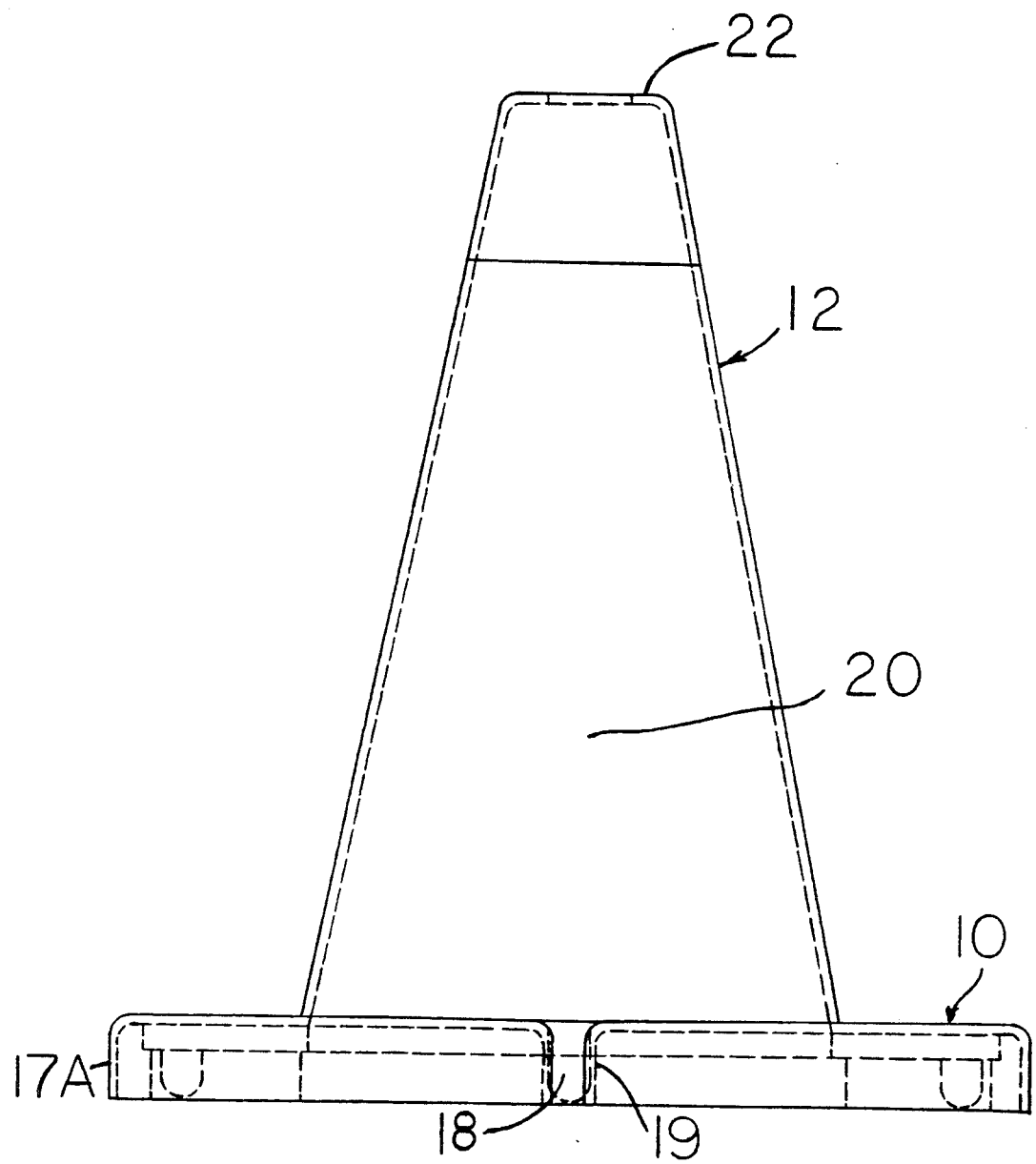
FIG. 3 is a side elevational view of the fishing hole cover shown in FIGS. 1 and 2.
Figure 4:
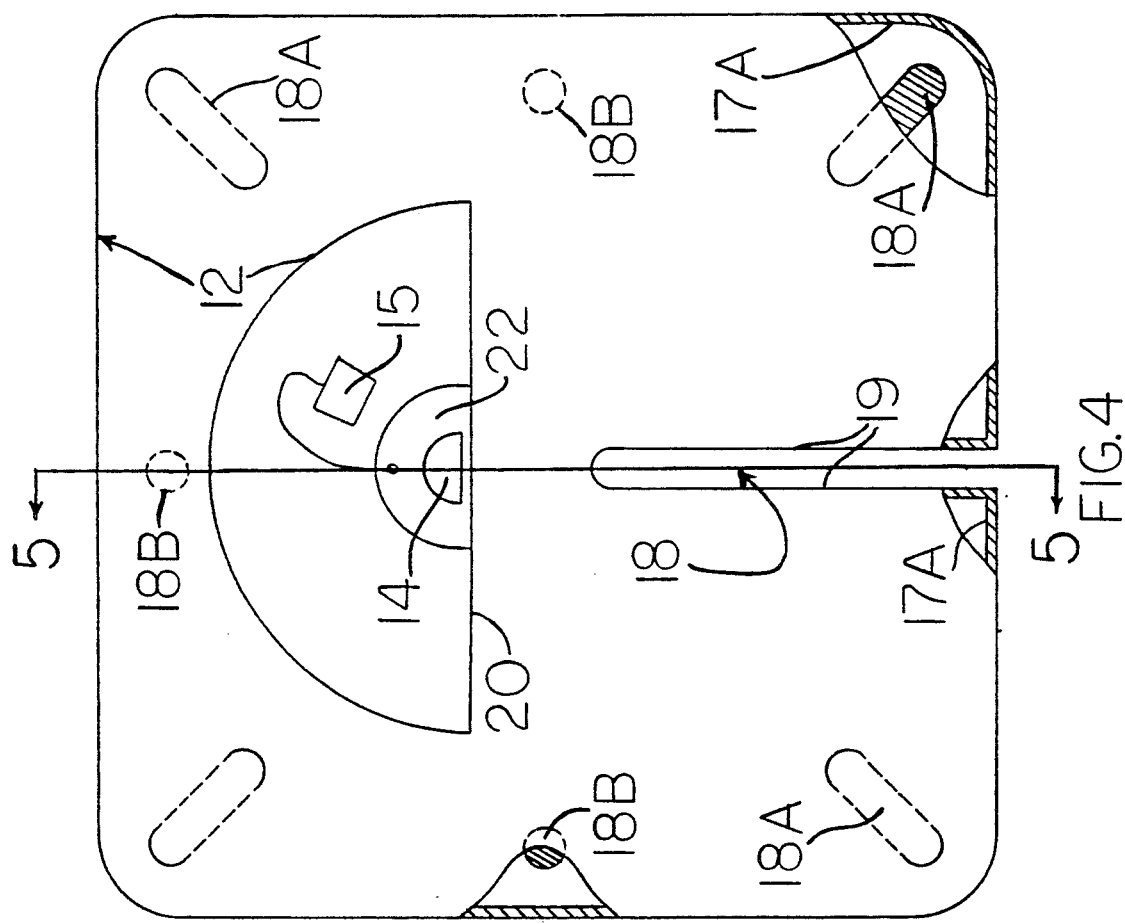
FIG. 4 is a top plane view of the fishing hole cover unit shown in FIG. 1-3.
Figure 5:
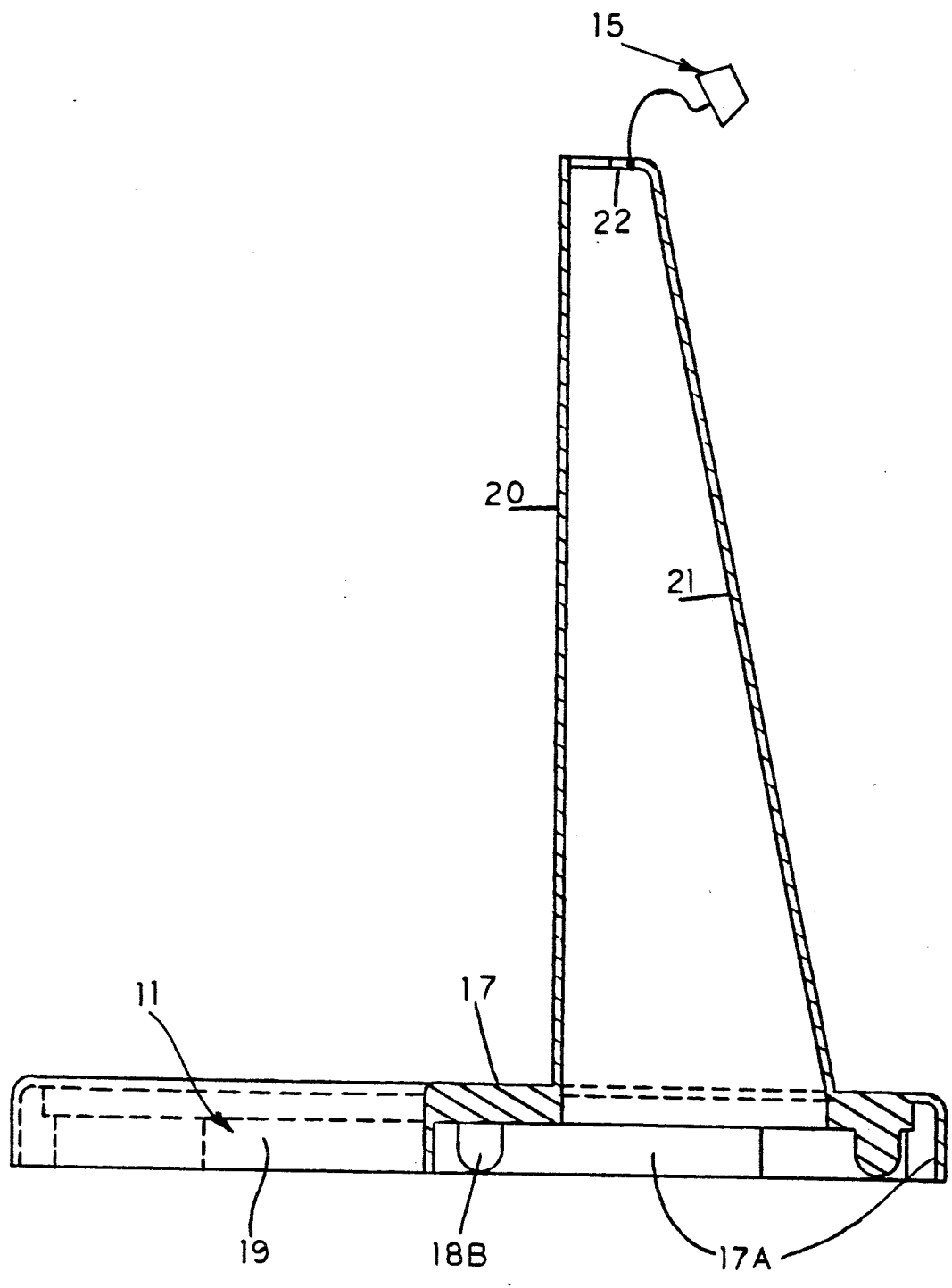
FIG. 5 is a cross-sectional view of the fishing hole cover taken generally on line 5—5 of FIG. 4.

Referring to the drawings and particularly to FIGS. 1 and 2, a fishing hole cover unit 1 illustrating one embodiment of the present invention is shown resting on the upper ice surface 2 of an ice covered body of water such as a river or lake 3. The ice 2 is formed with an appropriate opening 4 providing access to the water 3 for fishing purposes. A fishing reel 5 is supported within the water by a suitable support structure 6 projecting upwardly through the cover unit I. A fish line 7 on the reel is lowered into the water in accordance with conventional practice and is also coupled through the support structure 6 to a suitable indicating device 8, normally referred to as a tip up unit. When a fish strikes and is hooked on the line 7, it actuates the tip up unit 8 to signal the fisherman, who can then proceed to remove the cover and retrieve the fish in accordance with conventional practice.

The present invention is particularly directed to the cover unit 1, a preferred embodiment of which is illustrated in the drawing.

Generally, the cover unit 1 includes a base cover 10 shown as a generally rectangular configured plate with a width somewhat greater than the fishing opening 4. The cover 10 provides an essentially continuous protective layer over the opening 4 to prevent freezing of the water. The cover 10 includes a narrow diametric slot 11, projecting inwardly from one side in the illustrated embodiment and terminated generally centrally of the cover 10. The fishing line 7 extends through the inner end of the slot 11. Thus, the slot 11 requires a minimal lateral dimension and effectively maintains a continuous thermal covering over the opening 4.

In addition to the cover 10, the cover unit 1 includes a substantially vertically upstanding tubular post 12 projecting upwardly a significant distance from the top of the cover 10. The tubular post 12 is provided with a clearly visible upper portion 13 for providing a clear indication of the presence and location of the ice hole covered unit 1. Thus, in the illustrating embodiment of the invention, the individual indication portion 13 is shown as a simple bright coating 13, at least on the upper end of the tubular member. A bright fluorescence orange or the like provides a highly satisfactory indication during the day and night fishing hours.

The tubular post 12 has a top opening 14 which provides viewing access into the fishing hole. A cap or plug 15 is releasably secured with the opening 14 to close the opening and trap the heated air within the cover unit.

The cover unit 1 is preferably formed as a simple molded member formed of a suitable plastic which is not adversely effected by the freezing temperatures encountered when ice fishing and which can withstand normally handling in use and for storage. For example, the cover unit I may be conveniently formed of the material such as polyurethane used to form orange colored roadway separators which are placed on roadways to separate portions thereof and divert traffic from such portions. Such units have the necessary elasticity and toughness to operate for long periods without special care in handling or storage. A styrofoam plastic or like material having a relatively high thermal insulating factor may also be used to further insure against water freezing within the fishing opening.

The outer surface of the cover unit is preferably coated with a suitable black coating 16 to absorb radiant energy and thereby increase the temperature of the environment within the cover unit 1 and the water of opening 4.

More particularly, in the illustrated embodiment of the invention, the cover unit 1 is shown formed of a relatively thin molded plastic. The base cover 10 is an inverted dish-shaped member having an outer or top wall 17 and four depending side walls 17a forming a supporting rim. Various strengthening supports 18 are integrally formed between the top wall 17 and the side walls 17a. In the illustrated embodiment, corner supports 18a are shown extending diagonally from the four corners of the cover for a short distance. In addition, small posts 18b are centrally located between the corners, except at the location of the slot 11. The supports 18 establish a stable support on the ice 3 and strengthen the base cover 10.

The fish line slot 11 is formed as a narrow slot projecting inwardly from the one side wall 17a and includes its own depending side walls 19 projecting inwardly for the same distance as the sidewalls 17a. The slot side walls 19 maintain a maximum effective closure over the fishing opening 4 to minimize the exposure of water to the surrounding air and particularly limiting exposure upwardly of the cover 10 generally to the air at the narrow slot 11.

The tubular post 12 is formed in the opposite half of the cover 10 from the slot 11. In the illustrated embodiment of the invention, the tubular post member is shown as approximately one-half of a cone. Thus, the tubular post 12 has a flat wall 20 projecting upwardly from the top wall 17 of cover 10; substantially parallel to the side wall 17a and perpendicular to the slot 11. The flat wall 20 is spaced outwardly from the inner end of the slot 11 and extends substantially normal to the slot to approximately one-half the distance to the cover sidewalls 17a. The opposite ends of the flat wall 20 are joined by the conically shaped outer wall 21.

The flat wall 20 is formed as a relatively thin continuous wall generally of the thickness of the cover or the like. The outer enclosing conically shaped wall 21 is also formed of a similar thickness and terminates in a common top plane with the vertical flat wall 20. The upper end of the post 12 has an integral top wall 22 projecting inwardly from the cone-shaped wall 21 and defining with the adjacent vertical wall the small semi-circular top opening 14 for viewing downwardly through the tubular member to the surface of the water. The cap 14 is a plastic member which fits firmly but releasably within the opening to prevent the escape of the heated air.

In ice fishing, the reel, line and tip up are assembled with the cover unit, with the reel lowered into the water. The cover unit 1 is set to rest on the ice overlying the hole 4. The cover unit 10 is located with the curved wall 21 facing the wind.

The base cover 10 with the sidewalls 17a and slot sidewalls 19 engaging the ice defines a chamber overlying the opening 4 to trap a heated volume of air over the opening 4. The supports 18 establish a stable support of the cover unit 1 on the ice. The upstanding post 12 increases the size of the chamber for trapped air. The cover unit 1 absorbs the radiant heat of the sun, and heats the air within the inner chamber defined by the cover unit 1. Any heat given off by the water is also trapped with the chamber. The cover unit thus serves to prevent freezing of the upper surface of water 3 within opening 4. The semi-circular post 12 provides an excellent field of vision into the fishing hole 4, with the tip-up unit resting on the center of the cover unit and the line feeding smoothly through the slot 11 and the hole 4. The flat wall 20 of the post 12 also defines a flat square edge for locating and holding the tip-up unit in optimum orientation during fishing.

The semi-circular conical post 12 also provides a convenient carrying handle, as well as a raised marker 13 for easy viewing and locating of the cover unit.

Applicant has further found that the hollow structure with the flat base wall 17 and the separate flat and conical wall 21 provides a low-cost fishing hole cover which eliminates some of the complexity and cost of the typical prior art devices while providing an effective cover unit which prevents the hole freezing over and which is readily seen by other persons moving over the ice cover of a like, river or the like.

Various modes of carrying out the invention are contemplated as being within the scope of the following claims particularly pointing out and distinctly claiming the subject matter which is regarded as the invention.

I claim:

1. An ice fishing hole cover device for covering a fishing hole in ice, comprising a cover unit having a base formed of a heat-insulating material and adapted to be supported in overlying relation to said hole and having a fishing line opening for receiving of a fishing line with a first end extended through the hole into the water and an outer extended end extending outwardly of the hole and over said base, and an upstanding tubular extension post secured to the upper surface of said base and projecting upwardly a substantial distance from said base and said outer extended end of said fishing line, said base extending laterally from said post to establish an extended supporting surface over the ice, said base and tubular extension post having a restricted viewing opening extending downwardly through the tubular extension post and said base to the fishing hole.

2. The fishing hole cover device of claim 1, including a visual indicating means secured to the upper end of said tubular post to identify the location of the ice cover unit.

3. The fishing hole cover device of claim 2, wherein said post includes an outer black coating for absorption of radiant energy, and said visual indicating means includes a bright fluorescent coating on the upper end of the tubular post.

4. The cover device of claim 1, wherein said fishing line opening is an elongated narrow opening, said post has a flat wall extending perpendicular to the narrow opening and having an outer conical wall extending from said flat wall.

5. The cover device of claim 4, wherein said fishing line opening is an elongated narrow opening, said post has a flat wall extending perpendicular to the narrow opening and an outer conical wall extending from the flat wall, said base in an inverted dish-shaped member including an outer rim adapted to rest on the ice, and said narrow opening is a narrow slit extending inwardly from the outer rim located in opposed spaced relation to said flat wall and terminating in close spaced relation to said flat wall.

6. The cover device of claim 1, wherein said base and post are constructed of an opaque material having an outer heat absorbing coating.

7. The cover device of claim 1, wherein said base is an inverted dish-shaped member including an outer rim adapted to rest on the ice.

8. An ice fishing hole cover device for preventing freeze-over of the water within a fishing hole, comprising a base having a top surface and depending outer sidewalls, said base being formed of a heat-insulating material and adapted to be supported in overlying relation to said hole, said base having a narrow elongated slot for receiving of a fishing line, an upstanding post secured to the top surface of said base and within the outer side walls of said base and projecting upwardly a substantial distance from said base and said slot said slot extending laterally outwardly of said post, said post having a flat wall extending perpendicular to said slot and having an outer conical wall extending from said flat wall.

9. The cover device of claim 8, wherein said post is a hollow member and having a top opening to expose the hole for viewing.

10. The cover device of claim 9, including a visual indicating means on the upper end of said post to identify the location of the ice cover device, said base is an inverted dish-shaped member including an outer rim and having a lower plane adapted to rest on the ice and said slot including sidewalls extending downwardly to the plane of said rim.

11. The fishing hole cover device of claim 8, including a visual indicating means on the upper end of said post to identify the location of the ice cover device.

12. The cover device of claim 11, wherein said visual indicating means includes a bright fluorescent coating on the upper end of the tubular post.

13. The cover device of claim 8, wherein said base is an inverted dish-shaped member including an outer rim and having a lower plane adapted to rest on the ice and said slot including sidewalls extending downwardly to the plane of said rim.

14. The cover device of claim 8, wherein said heat-insulating material is a tough and elastic plastic.

15. The cover device of claim 8, wherein said base and post are integral and include a thin wall defining a substantially open bottom and hollow cover device.

* * * * *

UNITED STATES PATENT AND TRADEMARK OFFICE
CERTIFICATE OF CORRECTION

| | | |
|---|---|---|
| PATENT NO. | : | 5,154,015 |
| DATED | : | October 13, 1992 |
| INVENTOR(S) | : | ARNALD PECARD |

It is certified that error appears in the above-identified patent and that said Letters Patent is hereby corrected as shown below:

Col. 6, claim 1, line 37, after "slot" (1st occurrence) and before "said" insert ---,---(comma).

Signed and Sealed this

First Day of March, 1994

Attest:

BRUCE LEHMAN

Attesting Officer

Commissioner of Patents and Trademarks